United States Patent

Kruklitis

[15] 3,668,634

[45] June 6, 1972

[54] DYNAMIC THRESHOLD VOLTAGE DETERMINATION SYSTEM

[72] Inventor: Karlis Kruklitis, Plymouth, Mich.

[73] Assignee: Burroughs Corporation, Detroit, Mich.

[22] Filed: May 6, 1970

[21] Appl. No.: 35,084

[52] U.S. Cl. ....................... 340/146.3AG, 307/235, 328/115
[51] Int. Cl. ........................................................... G06k 9/00
[58] Field of Search ..............340/146.3, 146.3 AG; 328/115; 307/235

[56] References Cited

UNITED STATES PATENTS 3,159,815 12/1964 Groce ................................340/146.3

OTHER PUBLICATIONS

Villante, IBM Tech. Disclosure Bulletin, Vol. 5, No. 6, " Automatic Threshold Control Circuit," Nov. 1962, pp. 55 & 56.
Neville, IBM Tech. Disclosure Bulletin, Vol. 12, No. 6, " Character Recognition Circuitry of Increased Resolution," Nov. 1969, pp. 904 and 905.

*Primary Examiner*—Maynard R. Wilbur
*Assistant Examiner*—Leo H. Boudreau
*Attorney*—Kenneth L. Miller and Edwin W. Uren

[57] ABSTRACT

A dynamic threshold voltage system for neutralizing the unwanted electrical signals caused by intertrack crosstalk as generated in multi-track electromagnetic transducers. The system is responsive to the amplitudes of intelligence bearing electrical signals to generate a direct current voltage threshold level which is a predetermined ratio of the intelligence bearing signal. This threshold level is applied to all of the data channels for the multi-track electromagnetic transducer to effectively neutralize any unwanted crosstalk originated signal appearing on any channel.

3 Claims, 2 Drawing Figures

INVENTOR.
KARLIS KRUKLITIS
BY
Russel C. Wells
ATTORNEY

DYNAMIC THRESHOLD VOLTAGE DETERMINATION SYSTEM

BACKGROUND OF INVENTION

1. Field of Invention

This invention relates in general to a control system for handling a wide dynamic voltage range of information signals and more particularly to a dynamic voltage threshold system for neutralizing intertrack crosstalk in multi-channel magnetic character recognition systems.

2. Description of Prior Art

In previous character recognition systems be they optical or magnetic, crosstalk between data tracks or channels is controlled or minimized by systems or devices which are based on the concept of "bucking" signals. The bucking signal concept utilizes a portion of the actual intelligence signal voltage or signal current which is electrically reversed in polarity from the actual signal and applied to the track or channel carrying the crosstalk signal. This reversed signal then "bucks" or subtracts from the intelligence signal on applied channel to thereby remove the crosstalk signal. In doing so, however, the bucking signal also reduces the intelligence signal voltage or signal current generated by the applied channel.

Such systems, as described above, require sophisticated structures involving shielding to prevent electromagnetic or magnetic pick up of undesirable signals which would reach the data channels and function as intelligence bearing signals. By their very nature the overall effective dynamic operating range of such systems is comparatively restricted. The principal components which comprise such systems are generally reactive in nature and are easily influenced by external magnetic or electrical fields.

It is a primary object of the present system to dynamically control the threshold voltage for neutralizing or render ineffective crosstalk between adjacent electromagnetic transducers in multi-channel character recognition systems.

It is another object of the present system to avoid the use of reactive circuit components and still maintain dynamic neutralization of intertrack crosstalk in magnetic character recognition systems.

SUMMARY OF INVENTION

In a multi-channel magnetic character recognition system, intertrack crosstalk is minimized by a dynamic threshold voltage system responsive to a magnetically encoded character imprinted on a document. The document is movable along a path relative to a magnetic head having a plurality of individual and parallel arranged electromagnetic transducers. As the character on the document is scanned by the magnetic head, each individual electromagnetic transducer generates an electrical signal in response to the portion of character scanned thereby. The electrical signal has a voltage range between a reference voltage characterizing the document and an extreme voltage characterizing the character. The output of each electromagnetic transducer is electrically connected to one end of each of a plurality of unidirectional voltage coupling means. The other ends of said unidirectional voltage coupling means are collectively electrically connected together and to the control lead of a current control member.

Electrically connected in parallel circuit to the current control member is a voltage generating means which generates a fixed threshold voltage level. The current control member responding to the signal from the unidirectional voltage coupling means varies the threshold voltage level in proportion to the electrical signals from the electromagnetic transducers. This threshold voltage signal is applied to one input of each of a plurality of comparator means to which another input is respectively connected to each electromagnetic transducer. The comparator means causes a digital signal to be generated therefrom indicating the information value of the electrical signal as compared to the threshold voltage signal.

DETAILED DESCRIPTION

Figures 1, 2:
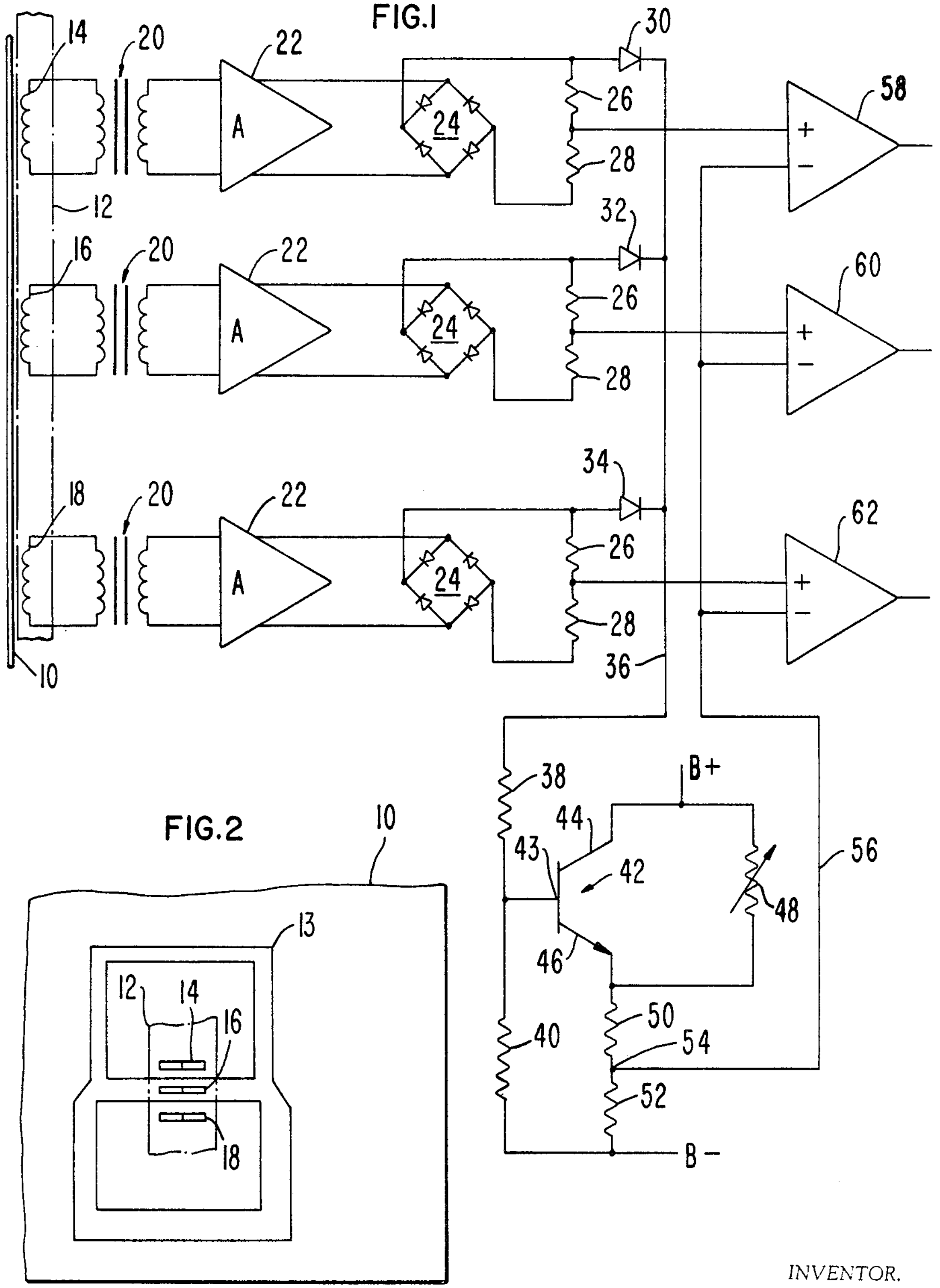
FIG. 1 is a schematic drawing of a character recognition system incorporating the dynamic threshold voltage system.
FIG. 2 is a graphic illustration of a magnetic character imprinted on a document.

Referring to the FIGS. by the characters of reference, there is illustrated in FIG. 1 a document 10 moving along a document transport path not shown over the pole tips of a magnetic head 12. The magnetic head 12, in the preferred embodiment has a plurality of individual and parallel arranged electromagnetic transducers as described in my co-pending application which is incorporated herein by reference entitled "Multiple Transducer Magnetic Head" filed on June 16, 1969 having Ser. No. 833,909 and assigned to the same assignee as is this application.

In FIG. 2, there is shown for reasons of clarity only three individual electromagnetic transducers, 14, 16 and 18. Each electromagnetic transducer scans a portion of a magnetically encoded character 13 imprinted on the document 10. By way of example if the spacing of the several electromagnetic transducers 14, 16 and 18 are close enough, the whole character may be scanned by as many as 10 or more individual electromagnetic transducers depending, of course, on the size of the character. In such an example, the output of each individual electromagnetic transducer will generate an electrical signal representing only 1/10th of the character.

As is well known in the character recognition art, the voltage amplitude of the signal generated from a magnetically encoded character 13 is typically very small and in the range of microvolts, therefore, a suitable transformer 20 is electrically connected to each electromagnetic transducer. The output from the transformer secondary is applied to a suitable amplifier 22. Since the electrical signal generated by each electromagnetic transducer is an alternating signal, the output of the amplifier is rectified in a full wave rectifier 24 to provide a pulsating direct current signal.

The output of the rectifier 24 is developed across a voltage divider network comprising first 26 and second 28 resistors. The function of the voltage divider network is to attenuate the rectifier output signal for succeeding electrical stages.

The output of each rectifier 24 is also coupled through a unidirectional voltage coupling means or diode 30, 32 and 34 to a common signal line 36. As illustrated in the drawing, the cathodes of each diode 30, 32, and 34 are collectively connected together to the common signal line 36. The signal line 36 terminates at a control means comprising a pair of series connected resistors 38 and 40 to some reference voltage B−. The function of these two series connected resistors is to control a current control member 42 which in the preferred embodiment is a transistor, therefore, the junction between the two resistors 38 and 40 is electrically connected to control or base lead 43 of the transistor.

Electrically connected in parallel circuit across the collector 44 and emitter 46 leads of the transistor 42 is a variable resistor 48. The function of this resistor is to initially condition the overall system as respects the noise level in a manner as will hereinafter be explained. The collector 44 and one end of the resistor 48 are electrically connected to a voltage source B+. A pair of resistors 50 and 52 are connected in electrical series circuit between the junction of the emitter 46 and other end of the variable resistor 48 and the reference voltage B−. The interconnecting point 54 between the resistors 50 and 52 is the terminal at which the threshold voltage is developed.

A threshold voltage signal line 56 connects the terminal point 54 to one input of each of a plurality of comparator means 58, 60, and 62. In the preferred embodiment, each comparator means is a differential amplifier and the threshold voltage is applied to the negative input. The attenuated voltage which was developed across resistor 26 from each electromagnetic transducer is electrically applied to the positive terminal of each differential amplifier. As illustrated, there are three separate data channels each beginning with an electromagnetic transducer 14, 16 or 18 and respectively ending with a comparator means 58, 60, and 62. The basic function of each comparator means is to perform an analog comparison between two electrical signal, the first being the electrical signal generated by the electromagnetic transducer 14, 16 or 18 and the second being the threshold voltage signal from junction 54 and as a result of the comparison to develop a digital signal. If the electrical signal generated by the electromagnetic transducer is greater than the threshold voltage, a binary one signal is developed and if the converse is true a binary zero signal is developed.

OPERATION

Present in magnetic character recognition systems is the condition commonly called noise. Since the electrical signals generated by the electromagnetic transducers of a magnetic head are small any electrical noise voltage may have a voltage amplitude of a significant value developing a low or marginal signal-to-noise ratio. Fortunately in most systems this noise voltage value has a permanent or fixed component which is a function of the constants of the individual system. The dynamic threshold voltage system which has been previously described provides an adjustment to compensate for this component of the noise voltage.

As has been previously described, a voltage divider network comprising the variable resistor 48 in electrical series with two fixed resistors 50 and 52 is connected across a voltage supply from B+ to B–. The function of this variable resistor is to adjust the voltage appearing at the junction 54 to such a value as will overcome the permanent component of the noise voltage. Therefore, this resistor is basically adjusted only once and that is upon the initial set up of the system. Once the value of this resistance is determined, the adjustable feature of the resistor is no longer required.

For the purposes of illustrations, we will consider a portion of a magnetic character 13 being scanned by the individual transducer 16 and will consider that the transducers 14 and 18 which are immediately adjacent and to either side of the transducer 16 as not scanning any portion of the character 13 at this particular instant of time. Such a condition may be found if we are scanning a horizontal bar of a character such as the figure eight as illustrated in FIG. 2. It is to be understood that all three transducers are basically within the magnetic fields of each other and the spacing between each transducer is substantially small. When the transducer 16 scans its portion of the character and moves from the document to the character, a signal is generated. This signal is coupled through the corresponding transformer 20 to the amplifier. The signal also is magnetically coupled to each adjacent transducer 14 and 18 causing condition known as crosstalk. These crosstalk signals are also coupled through their respective transformers to their amplifiers and amplified. At the anode of each of the diodes 30, 32 and 34 is an amplified electrical signal corresponding to the signal from the respective transducers. At the anode of the diode 32 in the preferred embodiment is a positive going signal of substantial amplitude, however, at the anodes of the diodes 30 and 34 there is found a positive going signal which is the result of the crosstalk. This crosstalk signal has an amplitude which is much less than the amplitude of the signal at the diode 32.

The three diodes 30, 32 and 34 function in a manner similar to a logical OR circuit and the voltage appearing on the common signal line will be the highest voltage found at the anode of anyone of the diodes. Therefore, the positive signal anode of the diode 32 appears on the signal line 36 and is applied to the voltage divider network 38 and 40.

This signal is attenuated by the two resistors 38 and 40 and is applied to the base 43 of the transistor 42. As the amplitude of this signal is greater than the amplitude of the voltage appearing at the junction of the resistors 48 and 50, the transistor 42 will begin to conduct. The transistor 42 operates class A and therefore depending on the magnitude of the signal on the base 43 the degree or amount of conduction of the transistor is determined. As the transistor begins to conduct, the amount of current flowing through the collector-emitter leads 44 and 46 of the transistor is applied to the voltage divider network comprising resistors 50 and 52. The current flowing through the transistor is added to the current flow from the resistor 48 thereby increasing the amount of current flowing through both resistors 50 and 52. As the current through the resistors increases, the threshold voltage at the junction 54 also increases.

The threshold voltage generated at the junction point 54 is proportional to the largest amplitude appearing at any of the diodes 30, 32 and 34. As the voltage on signal line 36 increases, so does the voltage at the junction point 54 and conversely if the voltage at the signal point on the signal line decreases the voltage at junction point 54 also decreases. If there is no signal being generated by the magnetic head 12, then the transistor 42 will not be in conduction and the voltage at the junction point 54 will be the fixed threshold voltage.

The threshold voltage from the junction point 54 is applied by the signal line 56 to the negative input of each of the comparators 58, 60 and 62. To the positive input of each comparator is applied a signal representing the voltage at the anode of the three diodes 30, 32 or 34 which signal has been respectively attenuated by the two series resistors 26 and 28.

In the present example as illustrated in FIG. 2, the transducer 16 is scanning the character while the transducers 14 and 18 are not, therefore, the voltage of the anode 32 is much greater than the voltage at the anodes 30 and 34. The voltage at the positive terminal of the comparator 60 is greater than the voltage is that at the positive terminals of the comparators 58 and 62. Since the threshold voltage as generated at the junction 54 is proportional to the larger voltage, the output of the comparator 60 will be a binary one signal and the output of the comparator 58 and 62 will be a binary zero signal.

There has been shown and described a dynamic threshold voltage system which functions to minimize the crosstalk between adjacent transducers of a multitrack magnetic head. This system is dynamic by maintaining the threshold voltage within a predetermined ratio of largest signal voltage of the individual electromagnetic transducers through the function and operation of the current control member 42.

What is claimed is:

1. In a multi-channel magnetic character recognition system, a dynamic threshold voltage system comprising:

a document having a magnetically encoded character imprinted thereon, transducing means having a plurality of individual and parallel arranged electromagnetic transducers each transducer scanning a predetermined portion of the character on said document as said document moves relative to said transducing means and generating an electrical signal in response to the portion of the character scanned thereby, said electrical signal having a voltage range between a reference voltage characterizing the document and an extreme voltage characterizing the character, a plurality of diodes individually electrically connected from their cathode to each of said electromagnetic transducers and directly responsive to the electrical signal generated by said electromagnetic transducers and all the anodes of said diodes electrically connected together, threshold voltage generating means for generating a threshold voltage for differentiating between a character and the document background, said threshold voltage generating means including a voltage generating means generating a predetermined fixed threshold voltage level said fixed threshold voltage level intermediate the reference voltage and the extreme voltage of said electrical signal, and a current control member electrically connected in parallel circuit to said voltage generating means and directly responsive to the electrical signals generated by said transducer means which are directly coupled thereto by said diodes for varying the threshold voltage level according to the magnitude of the extreme voltage level of said electrical signals, and a plurality of comparator means each electrically coupled respectively to one of said electromagnetic transducers and said threshold voltage level for generating a digital electrical signal whenever said electrical signal from said transducer is greater than said threshold voltage level signal.

2. In a magnetic character recognition system, a threshold voltage system according to claim 1 wherein said current control member is a transistor normally biased off to maintain said fixed threshold voltage level in the absence of a character at the predetermined voltage level.

3. In a multi-channel magnetic character recognition system, a dynamic threshold voltage system according to claim 1 wherein said threshold voltage generating means further comprises:

a voltage source, a first resistor electrically connected at one end to the source terminal of said voltage source, a second resistor electrically connected in series with said first resistor, a third resistor electrically connected in series with said first and second resistors and electrically connected to the return terminal of said voltage source, said first, second and third resistors defining a predetermined fixed normal voltage threshold value at the junction of said second and third resistors, a transistor electrically connected in parallel circuit with said first resistor for increasing the amount of current to said second and third resistors for varying the threshold voltage generated at the junction of said second and third resistors, and control means electrically connected to the base lead said transistor and responsive to the electrical signals from said diodes for biasing said transistor off in the normal state for maintaining the predetermined fixed threshold voltage level and for operating said transistor in response to the changes in said electrical signals to increase the threshold voltage level proportionally.

* * * * *